INVENTORS.
Edgar Gretener
BY Hans Arni
Gifford, Scull & Burgess
ATTORNEYS

Patented June 29, 1937

2,085,190

UNITED STATES PATENT OFFICE 2,085,190

COLOR FILTER

Edgar Gretener, Berlin-Siemensstadt, and Hans Arni, Berlin-Ruhleben, Germany, assignors to Opticolor, Aktiengesellschaft, Glarus, Switzerland, a Swiss corporation Application July 27, 1935, Serial No. 33,534
In Germany August 7, 1934

2 Claims. (Cl. 95—81.5)

Polyzoned filters, especially those intended for use with lenticulated film, have already been made for many different materials.

Filters which contain liquids as well as those of colored gelatine, colored collodion or colored glass are well known.

One advantage of liquid filters is that they can be made in a very simple manner since many dyes can be mixed together without causing untoward results. The production of filters from solid materials does not permit of extensive mixing of ingredients for the number of miscible color solids is limited and the color solids often react chemically with one another so that the color value of the resulting mixture cannot be foreseen and in most cases in unusable. On account of the much greater each with which liquid filters can be produced and the much greater certainty with which a predetermined light transmission can be obtained and the greater transparency of dye solutions, fluid filters are preferable. Oftentimes, especially in the projection of lenticulated films, it is impossible to attain certain points in the color triangle with filters of solid substances. This is true with a great number of blue tones. When using solid blue filters, they usually have too great a red content and are therefore too far from the required spectral curve.

But with fluid filters it is highly important to take care that they are not too strongly heated since excessive heating may destroy the filter. It is especially important when using a fluid filter for projection with an objective of short focal length which in consequence is of small diameter and concentrates the total light flux on the small area of the filter. The invention is based on a fluid filter which is usable in such cases since provision is made to avoid undue heating and the destructive action of the light flux.

According to the purpose of the invention, the partitions between the different color compartment zones are made of material having high heat conductivity so that the absorbed energy in the fluids is conducted outward. In one especially advantageous design, the filter has a metal framework which serves to form the fluid retaining cells. Preferably the partitions between the different color zones are a part of the framework.

As the metal framework serving as the structure of the filter possesses high heat conductivity, it is easy to avoid undue heating of the filter. Should the heat conduction through the metal framework be not alone sufficient for dispersing the heat, passages can be made longitudinally through the different partitions between the fluid cells through which cooling gases or fluids may be forced.

The filter possesses other advantages which will be better understood from a description of the device as illustrated in the drawing attached hereto. In the drawing.

Figure 1:
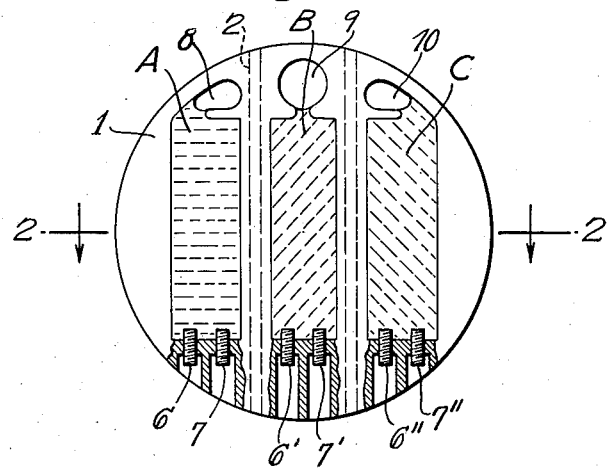
Fig. 1 is a face view, partly in section, showing one form which the invention may take.
Figure 2:
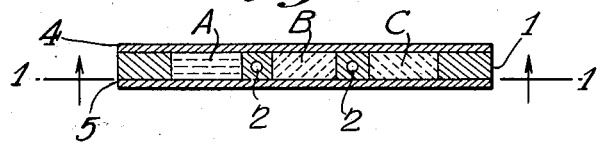
Fig. 2 is a section approximately on the line 2—2 of Fig. 1.

A circular metal plate 1 is provided with cut-out spaces which serve for the formation of cells A, B, and C. Between the cut-out spaces, partitions 2 and 3 remain. To each side of the metal plate transparent plates 4 and 5 are cemented. These plates consist preferably of glass, and their surfaces are ground plane and exactly parallel to each other. Between the glass plates and the metal partitions are the cells which are to be filled with colored liquid. For filling and emptying there are provided for each cell two openings 6 and 7, 6' and 7', 6" and 7", respectively. These openings can be closed preferably by small screws. In order to avoid excessive pressure through heat expansion, the expansion chambers 8, 9, and 10 are provided in which a gas bubble remains so that the fluid can expand and contract. Therefore, since the fluid is in immediate juxtaposition with the metal parts which have a high heat conductivity, undue heating is avoided especially when the exterior of the filter is free and open to the surrounding air. A further possibility for adequate cooling is obtained when longitudinal holes are bored in the partitions 2 and 3 as shown in Figs. 1 and 2.

The fluid in the cells A, B, and C is selected to give the desired color effects. In the illustrated embodiment is shown a filter designed for use with a three-color process using the three primary colors, red, green, and blue, and the fluids placed in the respective cells have those colors. Obviously, if a greater or less number of color zones is employed, the number of cells will be changed accordingly, each cell corresponding to one zone.

It is important for good performance of the fluid filter that the colored solutions be sufficiently inert and especially the metal which forms the cells, should not react with the dyes contained in the solution. Also the hydrogen ion concentration should not change by the action of the metal surface contacting the fluid solution. Nickel and chromium are especially good in this respect. In certain cases it is also an advantage to plate the walls of the metal frame with a noble metal (such as gold, silver or platinum). Also the cement for fastening the transparent plates and the plates themselves must be of material which does not react with the filter solutions.

Figure 3:
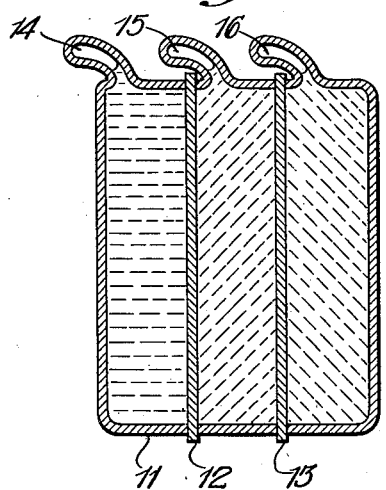
Fig. 3 is a view corresponding to Fig. 1, but showing a different embodiment of the invention.

The filter represented in Fig. 3 can be used in the same way as mentioned above. This form consists of a glass container 11 formed in one piece, but which is separated by the walls 12 and 13 into three separate cells. The walls 12 and 13 consist preferably of glass with fused in metal mesh reinforcement and may protrude from the glass container 11 as indicated, to give better cooling. Each of the three cells is so blown or fused that there are places 14, 15, and 16 forming glass bubbles as expansion chambers for the expansion of the fluid. Also in this construction of the cells, there must be no reaction between the composition of the walls and the dye solutions. Under certain circumstances the walls 12 and 13 can be formed of strong metallized glass.

We claim:

1. A polyzoned color filter for use with lenticulated films and having cells adapted to contain colored liquids to form the zones of the filter, said filter comprising a metal frame having said cells formed therein and having walls separating said cells, said walls having holes extending longitudinally therethrough, for the passage of a cooling fluid.

2. A polyzoned color filter for use with lenticulated films and having cells adapted to contain colored liquids to form the zones of the filter, said filter comprising a metal frame having said cells formed therein and having walls separating said cells, said walls having holes extending longitudinally therethrough, for the passage of a cooling fluid, and an expansion chamber at one end of each cell and connected to the cell by a narrow opening.

EDGAR GRETENER.
HANS ARNI.